G. E. PARKER & W. ELLINGER.
CORN PLANTER.
APPLICATION FILED NOV. 15, 1912.
1,073,816.
Patented Sept. 23, 1913.
2 SHEETS—SHEET 1.
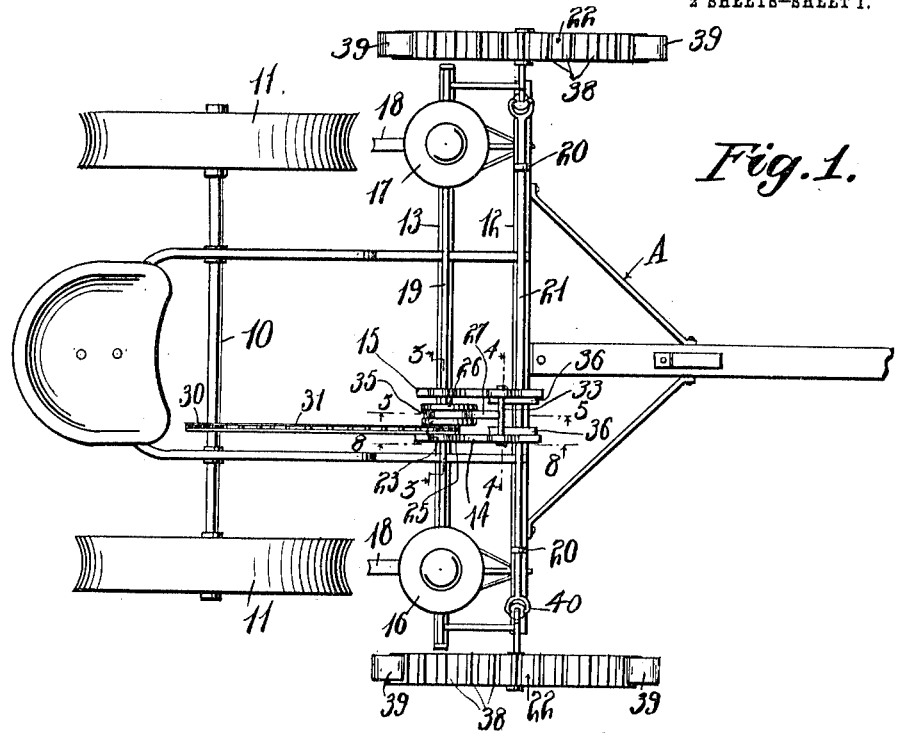
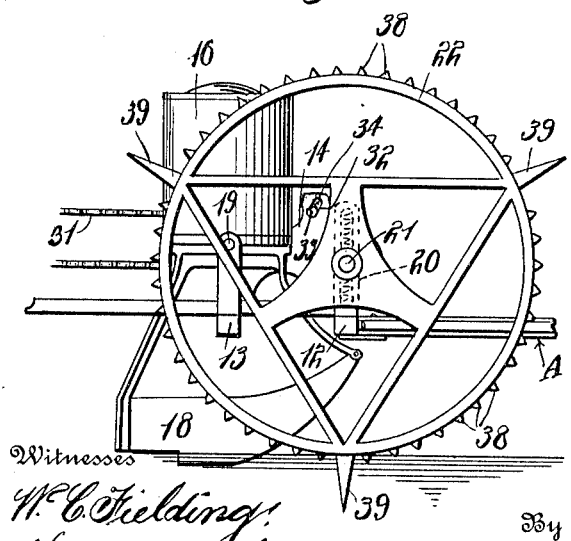
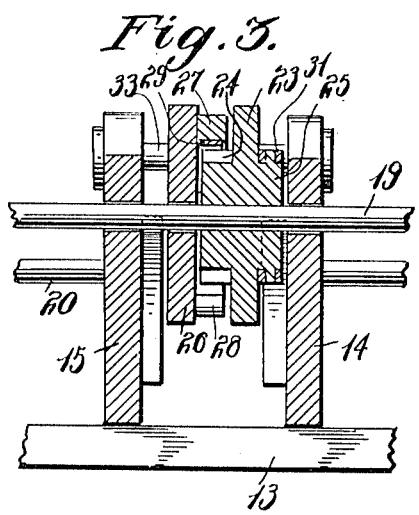
Inventors
G. E. Parker
and W. Ellinger,

G. E. PARKER & W. ELLINGER.
CORN PLANTER.
APPLICATION FILED NOV. 15, 1912.

1,073,816.

Patented Sept. 23, 1913.
2 SHEETS—SHEET 2.

Witnesses
W. C. Fielding.
Henry T. Bright

Inventors
G. E. Parker
and W. Ellinger,
By
Attorneys

UNITED STATES PATENT OFFICE.

GEORGE E. PARKER AND WILLIAM ELLINGER, OF FAIRHAVEN, MISSOURI.

CORN-PLANTER.

1,073,816.

Specification of Letters Patent.

Patented Sept. 23, 1913.

Application filed November 15, 1912. Serial No. 731,583.

*To all whom it may concern:*

Be it known that we, GEORGE E. PARKER and WILLIAM ELLINGER, citizens of the United States, residing at Fairhaven, in the county of Vernon, State of Missouri, have invented certain new and useful Improvements in Corn-Planters; and we do hereby declare the following to be a full, clear, and exact description of the invention, such as will enable others skilled in the art to which it appertains to make and use the same.

This invention relates to corn planters.

The object of the invention resides in the provision of a corn planter which will deposit the seed at desired intervals during the movement of the machine and which is operated to effect such depositing of the seed without the use of a checkrow wire.

A further object of the invention resides in the provision of a corn planter which is operated without the use of a checkrow wire and which will enable the operator to determine whether the seed is being properly deposited as the machine moves back and forth across the field.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 4:
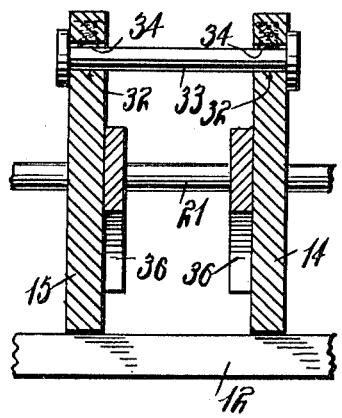
Figure 5:
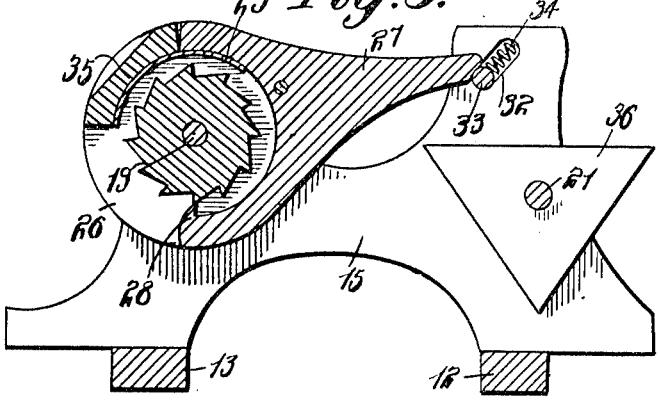
Figure 6:
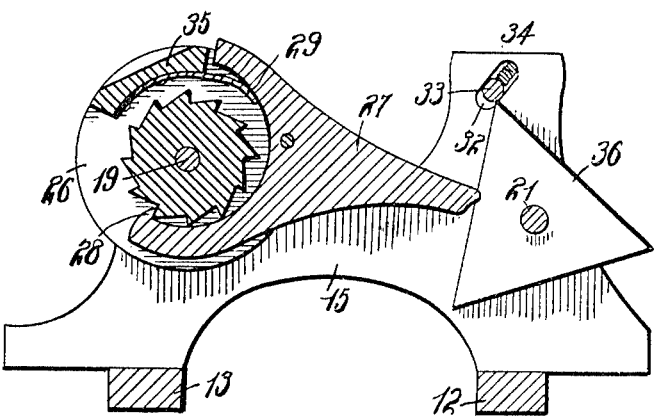
Figure 7:
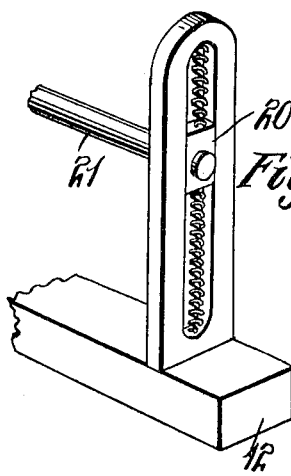
Figure 8:
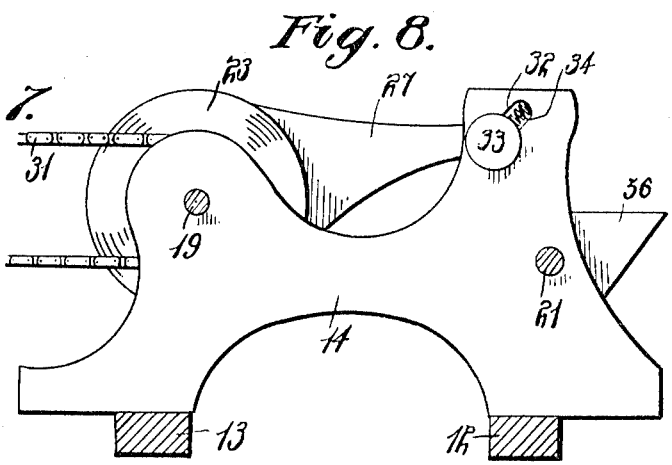

Figure 1 is a plan view of a corn planter constructed in accordance with the invention, only those parts of the planter essential to the understanding of the invention being shown. Fig. 2 a side view of a fragment of what is shown in Fig. 1, same being on an enlarged scale. Fig. 3 an enlarged section on the line 3—3 of Fig. 1. Fig. 4 an enlarged section on the line 4—4 of Fig. 1. Fig. 5 a section on the line 5—5 of Fig. 1 on an enlarged scale with the parts of the hopper shaft clutch in tripped position. Fig. 6 a view similar to Fig. 5 showing the parts of the hopper shaft clutch in thrown in or normal position. Fig. 7 a detail perspective view of a fragment of the clutch releasing shaft and showing one of the yielding terminal bearings of said shaft, and Fig. 8 a section on the line 8—8 of Fig. 1.

Referring to the drawings, A indicates the frame of the planter in which is rotatably mounted an axle 10 having fixed on each end thereof the usual traction wheels 11 and whereby the frame A is supported in elevation above the ground during the operation of the planter. The frame A includes a forward cross member 12 and an intermediate cross member 13 upon which are supported spaced brackets 14 and 15 extending longitudinally of the frame. Mounted upon the frame A are seed hoppers 16 and 17 from which depend the usual shoes 18. Rotatably mounted upon the frame A and disposed transversely thereof is a shaft 19 which extends through the discharge mouths of the hoppers 16 and 17 and is adapted by its rotation to intermittently effect the discharge of the seed from the hoppers in the usual and well known manner. This shaft 19 also extends through the brackets 14 and 15. Rotatably mounted upon the frame A in yielding bearings 20 and extending through the brackets 14 and 15 forward of the shaft 19 is a shaft 21 which has fixed on each end thereof ground wheels 22. Loose on the shaft 19 between the brackets 14 and 15 is a wheel 23 which has a hub extension on one side in the form of a ratchet wheel 24 and a hub extension on the other side in the form of a sprocket wheel 25. Fixed on the shaft 19 adjacent the ratchet wheel 24 is a wheel 26 which has pivoted thereon a Y-shaped pawl 27 disposed in embracing relation to the ratchet wheel 26 and having one arm thereof provided at its free end with a tooth 28 adapted for coöperation with the teeth of the ratchet wheel 24. The pawl 27 is normally held in operative relation to the ratchet wheel 24 by means of a spring 29. Fixed on the axle 10 is a sprocket wheel 30 disposed in alinement with the sprocket wheel 25 and traveling on the sprocket wheels 30 and 25 is a sprocket chain 31. By this construction it will be apparent that as long as the pawl 27 is maintained in operative relation to the ratchet wheel 24 the rotation of the axle 10 will effect a corresponding rotation of the shaft 19 and a resultant intermittent discharge of seed from the hoppers 16 and 17. Formed in the brackets 14 and 15 are alined inclined slots 32 in which is movably mounted the terminals of a tripping rod 33, said tripping rod being normally held in the lowermost end of said slot by means of springs 34. In its normal position the rod 33 is disposed so as to be engaged by the stem of the pawl 27 during rotation of the shaft 19 and such engagement between the pawl 27 and rod 33 will disengage the tooth 28 from the ratchet wheel and thus stop the rotation of the shaft 19 under the influence of the rotation of the axle 10. The movement of the pawl 27 as the result of engagement with the rod 33 is limited by a stop 35 secured to the wheel 26.

Mounted upon the shaft 21 between the brackets 14 and 15 for rotation with said shaft are triangular plates 36 disposed respectively adjacent the inner faces of the brackets 14 and 15, and which are adapted during their rotation to lift the rod 33 upwardly and thereby disengage same from the pawl 27. Each of the ground wheels 22 is provided with triangular portions which bear the same relation to the shaft 21 as the triangular plates 36. The peripheries of the ground wheels 22 are provided with cleats 38 and marking fingers 39, the latter being disposed at the points of the triangular portions 37 and are adapted to mark the line in which a deposit of seed has occurred. The shaft 21 is provided outwardly of both the brackets 14 and 15 with knuckles 40 which will permit the ground wheels 22 to adjust themselves to uneven ground without effecting the relation between the triangular plates 36 and the trip rod 33.

In the operation of the planter the rotation of the axle 10 will effect a rotation of the shaft 19 and result in a deposit of seed. As soon as the shaft 19 has made one complete revolution the pawl 27 will be thrown out by engagement with the rod 33 and the rotation of the shaft 19 stopped. The machine will then move along the ground without effecting any deposit of seed until the shaft 21 has been rotated so as to effect the elevation of the rod 33 and the disengagement of the latter from the pawl 27. When this takes place the rotation of the shaft 19 will be again instituted and another deposit of seed effected. This operation is repeated as the machine moves along the ground, the various parts being timed and adjusted so that the deposit of seed will take place at desired distances apart.

As the machine is returned across the field one of the ground wheels 22 will travel in the track previously made by same and the operator by observing whether the fingers 39 are striking their previous marks can determine if the proper deposit of seed is being effected.

What we claim is:—

In a planter, the combination of a frame, a wheeled axle supporting the frame and rotatably mounted on the latter, seed delivering mechanism mounted on the frame, a rotatable shaft mounted on the frame and adapted by its rotation to operate the seed delivering mechanism, a sprocket wheel loosely mounted on said shaft, a connection between said sprocket wheel and axle for rotating the former, a ratchet wheel fixed to said sprocket wheel, a disk fixed on the shaft, a pawl pivoted on the disk for operative engagement with said ratchet wheel, means normally holding the pawl in operative engagement with the ratchet wheel, brackets mounted on said frame, a tripping rod slidable in said brackets and normally disposed in the path of travel of said pawl whereby the engagement of the latter with the former will disengage the pawl from the ratchet wheel, a second shaft rotatably mounted on the frame, traction wheels fixed on the ends of said shaft respectively, and means secured to said second named shaft adapted during the rotation of the latter to intermittently move the tripping rod out of the path of travel of the pawl.

In testimony whereof, we affix our signatures, in the presence of two witnesses.

GEORGE E. PARKER.
WILLIAM ELLINGER.

Witnesses:
JASPER McCRARY,
F. D. EWING.

---

Copies of this patent may be obtained for five cents each, by addressing the "Commissioner of Patents, Washington, D. C."